(12) United States Patent
Nohara

(10) Patent No.: US 9,236,724 B2
(45) Date of Patent: Jan. 12, 2016

(54) BUSBAR UNIT

(75) Inventor: Mami Nohara, Makinohara (JP)

(73) Assignee: Yazaki Corporation, Tokyo (JP)

( * ) Notice: Subject to any disclaimer, the term of this patent is extended or adjusted under 35 U.S.C. 154(b) by 150 days.

(21) Appl. No.: 13/812,907

(22) PCT Filed: Jul. 20, 2011

(86) PCT No.: PCT/JP2011/066479
§ 371 (c)(1),
(2), (4) Date: Jan. 29, 2013

(87) PCT Pub. No.: WO2012/014753
PCT Pub. Date: Feb. 2, 2012

(65) Prior Publication Data
US 2013/0126204 A1    May 23, 2013

(30) Foreign Application Priority Data

Jul. 30, 2010  (JP) .................................. 2010-171821

(51) Int. Cl.
*H02G 5/02*       (2006.01)
*H01H 85/044*  (2006.01)
*H01H 85/02*    (2006.01)
(Continued)

(52) U.S. Cl.
CPC ............. *H02G 5/025* (2013.01); *H01H 85/044* (2013.01); *H01H 69/02* (2013.01); *H01H 85/11* (2013.01); *H01H 2085/025* (2013.01); *H01H 2085/0555* (2013.01)

(58) Field of Classification Search
CPC ............ H02M 7/003; H02G 5/00; H02B 1/21
USPC ........................ 174/68.2, 27, 149 B; 439/212
See application file for complete search history.

(56) References Cited

U.S. PATENT DOCUMENTS 5,785,542 A * 7/1998 Johnson ............... H01R 25/162
                                                                    439/210
7,321,286 B2 * 1/2008 Nojima ................ H01H 85/205
                                                                    337/186

FOREIGN PATENT DOCUMENTS

JP           5652421        5/1981
JP           429165 U     3/1992
(Continued)

OTHER PUBLICATIONS

JP Utility Model—JP04-29165.*
International Search Report (PCT/ISA/210) dated Oct. 4, 2011 issued by the International Searching Authority in counterpart International Application No. PCT/JP2011/066479.
(Continued)

*Primary Examiner* — Timothy Thompson
*Assistant Examiner* — Krystal Robinson
(74) *Attorney, Agent, or Firm* — Sughrue Mion, PLLC

(57) ABSTRACT

The busbar unit includes a first busbar having a substrate section provided with first fusible portions, and a first plate section that extends from the substrate section; a second busbar having a substrate section provided with a second fusible portion, and a second plate section overlapped with the first plate section; and an insulating housing section that accommodates the plate sections in a state in which the plate sections are overlapped with each other. The first plate section is provided with a retainer that fixes the first and second plate sections so that the first and second plate sections are not displaced in either a direction in which the first and second plate sections approach each other, or a direction in which the first and second plate sections are overlapped with each other.

9 Claims, 9 Drawing Sheets

(51) Int. Cl.
*H01H 85/055* (2006.01)
*H01H 69/02* (2006.01)
*H01H 85/11* (2006.01)

(56) References Cited

FOREIGN PATENT DOCUMENTS

| | | |
|---|---|---|
| JP | 2001-186631 A | 7/2001 |
| JP | 2001-273848 A | 10/2001 |
| JP | 2001273848 A | 10/2001 |

OTHER PUBLICATIONS

Written Opinion (PCT/ISA/237) dated Oct. 4, 2011 issued by the International Searching Authority in counterpart International Application No. PCT/JP2011/066479.

Office Action, dated Feb. 11, 2014, issued by the Korean Intellectual Property Office in counterpart Korean Application No. 10-2013-7002576.

Office Action dated May 29, 2015 issued by the State Intellectual Property Office of the People's Republic of China in counterpart Chinese Application No. 201180037525.7.

* cited by examiner

Fig. 3
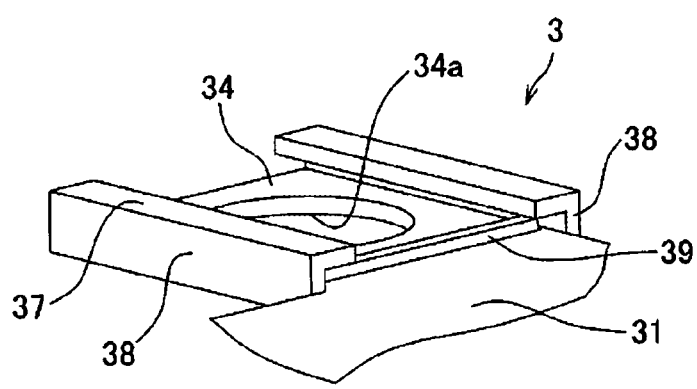
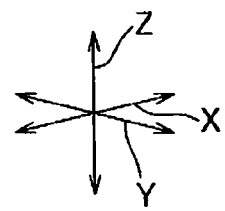

BUSBAR UNIT

TECHNICAL FIELD

The present invention relates to a busbar unit, and more specifically, to a busbar unit including a plurality of busbars that are connected with a battery of a vehicle to supply power supplied from the battery to a plurality of loads.

BACKGROUND ART

FIG. 8 is a plan view illustrating a busbar unit according to the related art. FIG. 9 is a plan view illustrating a first busbar configuring the busbar unit illustrated in FIG. 8. FIG. 10 is a plan view illustrating a second busbar configuring the busbar unit illustrated in FIG. 8. The busbar unit 101 of the related art illustrated in FIG. 8 includes a first busbar 103 provided with a first plate section 134, a second busbar 104 provided with a second plate section 144, and an insulating housing section (not illustrated) that accommodates the first and second plate sections 134 and 144 in a state in which the first plate section 134 and the second plate section 144 are overlapped with each other.

The first busbar 103 includes, as illustrated in FIG. 9, a substrate section 131 provided with a first fusible portion 102A, a plurality of load connection portions 133 connected to the substrate section 131 via the plurality of fusible portions 102A, and a first plate section 134 connected to the substrate section 131. The plurality of load connection portions 133 are respectively connected to a plurality of loads which will be described hereinafter. The first plate section 134 is provided with a hole 134a penetrating the first bus bar 103.

The second busbar 104 includes, as illustrated in FIG. 10, a substrate section 141 provided with a second fusible portion 102B, a plurality of load connection portions 143 connected to the substrate section 141 via the plurality of fusible portions 102B, and a second plate section 144 connected to the substrate section 141 and overlapped with the first plate section 134. The second plate section 144 is provided with a hole 144a communicating with the hole 134a in a state in which the first plate section 134 is overlapped with the second plate section 144.

The above-described busbar unit 101 of the related art is connected to the battery by inserting a battery post provided on the battery into the holes 134a and 144a in a state in which the plurality of holes 134a and 144a provided in the first plate section 134 and the second plate section 144 are communicated with each other, so that the power supplied from the battery is supplied to the plurality of loads such as a head lamp, a fog lamp, or various motors. (e.g., see PTL 1)

CITATION LIST

Patent Literature

[PTL 1] JP-A-2001-273848

SUMMARY OF INVENTION

Technical Problem

However, the above-described busbar unit 101 of the related art contains problems as follows. That is, when the busbar unit 101 of the related art is made by insert molding in the state in which the first plate section 134 is overlapped with the second plate section 144, it is necessary to press the first plate section 134 (the first busbar 103) and the second plate section 144 (the second busbar 104) so as not to be relatively displaced. Therefore, there is a problem in that its productivity is deteriorated.

Also, a gap is formed between the first plate section 134 and the second plate section 144 due to strain or deformation of the first busbar 103 and the second busbar 104. The formation of the gap causes the conductivity between the first plate section 134 (the first busbar 103) and the second plate section 144 (the second busbar 104) to deteriorate. Furthermore, when it is subjected to insert molding, molten resin flows in the gap between the first plate section 134 and the second plate section 144, which further deteriorates the conductivity between the first plate section 134 and the second plate section 144. If the worst comes to the worst, it is considered that generation of heat or continuity failure is caused.

An object of the present invention is to provide a busbar unit capable of increasing its productivity and also increasing reliability of electrical connection between a plurality of busbars that are connected with each other in order to supply power supplied from a battery to a plurality of loads.

Solution to Problem

The above object of the present invention is achieved by the following configuration.

(1) A busbar unit comprising:

a first busbar including a substrate section provided with a first fusible portion and a first plate section extending from the substrate section;

a second busbar including a substrate section provided with a second fusible portion and a second plate section overlapped with the first plate section; and an insulating housing section accommodating the first plate section and second plate section in a state in which the first plate section and second plate section are overlapped with each other, wherein one of the first plate section and second plate section is provided with a retainer for fixing the first plate section and second plate section so that the first plate section and second plate section are not displaced in both a direction in which the first plate section and second plate section are displaced close to each other and a direction in which the first plate section and second plate section are overlapped with each other.

(2) In the busbar unit of the configuration (1), the retainer is provided with a standing portion vertically arranged from an end portion of the one of first plate section and the second plate section in a perpendicular direction which is perpendicular to both the direction in which the first plate section and the second plate section come close to each other and the direction in which the first plate section is overlapped with the second plate section, and an overlapped plate which extended from the standing portion and is overlapped with the other of the first plate section and the second plate section.

(3) In the busbar unit of the configuration (1) or (2), a rib is formed in a convex shape from a surface of the one of the first plate section and the second plate section, and is provided at a position opposite to an end portion of the other of the first plate section and the second plate section in a state where the first plate section is overlapped with the second plate section, and the end portion of the other of the first plate section and the second plate section is spaced apart from the substrate section of the other of the first plate section and the second plate section.

(4) In the busbar unit of any one of the configurations (1) to (3), the first busbar has a first thickness, and the second busbar has a second thickness thinner than the first thickness.

According to the busbar unit of the configuration (1), the first and second plate sections are insert-molded, without being displaced in both the overlapped direction and the perpendicular direction, so that the busbar unit capable of improving the productivity can be provided.

According to the busbar unit of the configuration (2), while the first plate section (first busbar) and the second plate section (second busbar) are not displaced in both the overlapped direction and the perpendicular direction of the first plate section and the second plate section, the one plate section is slid along the direction coming close to the other, and thus the workability to overlap the busbars can be improved.

When the first busbar and the second busbar are subjected to the insert forming, the resin is prevented from flowing between the overlapped plate sections (busbars) by the standing portion and the overlapped plates. Accordingly, since the resin does not flow between the plate sections (busbars), the plate sections (busbars) can be closely overlapped with each other. As a result, it is possible to improve the reliability in the electrical connection between the plate sections (busbars).

According to the busbar unit of the configuration (3), the rib provided at the position opposite to the end portion of the other plate section, which is spaced apart from the substrate section, covers the gap between the first and second plate sections, and thus, at the time of insert molding, it is possible to prevent the resin from flowing between the plate sections which are overlapped with each other in the approaching direction. Therefore, since the resin does not flow between the plate sections (busbars), the plate sections (busbars) can be closely overlapped with each other. Thus, it is possible to further improve the reliability in the electrical connection between the first and second plate sections (busbars).

According to the busbar unit of the configuration (4), for example, the first busbar having the substrate section provided with the first fusible portions which interrupt the power supply if a current exceeding a first rated current flows is obtained by punching the sheet metal which is formed to have the first thickness. Also, the second busbar having the substrate section provided with the second fusible portions which interrupt the power supply if a current exceeding a second rated current flows is obtained by punching the sheet metal which is formed to have the second thickness thinner than the first thickness. Accordingly, if the plate thickness of the sheet metal is changed, it is possible to easily form the busbars provided with the fusible portions corresponding to the load which is operated by different driving current, without manufacturing a mould for punching. In addition, if the plurality of busbars are combined, it is possible to easily extensively cope with the load which is operated by the different driving current.

BRIEF DESCRIPTION OF DRAWINGS

FIG. 3 is an enlarged view illustrating a first plate section in FIG. 2 in an enlarged manner.

DESCRIPTION OF EMBODIMENTS

One embodiment of the present invention will now be described with reference to FIGS. 1 to 7. A busbar unit 1 illustrated in FIG. 1 or the like is connected to a battery to supply a power supplied from the battery to the plurality of loads such as a head lamp, a fog lamp, or various motors.

Figure 1:
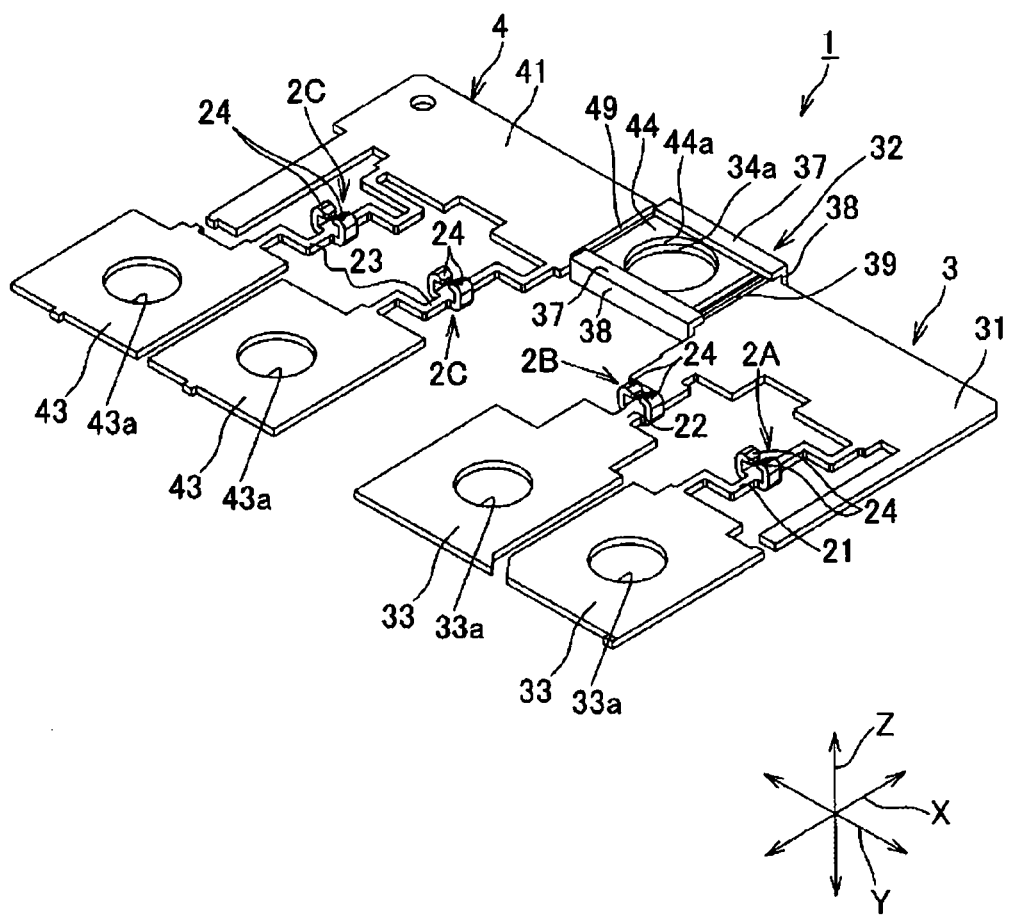
FIG. 1 is a perspective view illustrating a busbar unit according to one embodiment of the present invention.

The busbar unit 1 includes, as illustrated in FIG. 1, a plurality of fusible portions 2A, 2B and 2C; a first busbar 3 having a substrate section 31 provided with the plurality of fusible portions 2A and 2B for interrupting power supply when an electric current exceeding a first rated current value flows, and a first plate section (one plate section) 34 that extends from the substrate section 31; a second busbar 4 having a substrate section 41 provided with a plurality of fusible portions 2C for interrupting the power supply when an electric current exceeding a second rated current value smaller than the first rated current value flows, and a second plate section (the other plate section) 44 overlapped with the first plate section 34; and an insulating housing section (not illustrated) that accommodates the first and second plate sections 34 and 44 in a state in which the first plate section 34 is overlapped with the second plate section 44. Also, the first busbar 3 is made of a material (sheet metal) having conductivity higher than that of the second bus bar 4, and the first and second bus bars 3 and 4 are shaped to have an approximately same size.

Each of the plurality of fusible portions 2A and 2B has bases 21 and 22 of a band plate shape, a pair of crimping pieces 24 respectively provided at a center portion of the bases 21 and 22 in a longitudinal direction (direction of arrow X), and a low-melting-point metal (not illustrated) made of a metal having a relatively low melting point, such as tin or tin alloy. Also, the plurality of fusible portions 2A and 2B are respectively provided between the substrate section 31 and a plurality of load connection portions 33, which will be described later, provided on the first busbar 3. Among the plurality of fusible portions 2A and 2B, the fusible portion 2B is provided between the fusible 2A and the second busbar 4.

The bases 21 and 22 are formed in the shape of band plate, and both end portions thereof in the longitudinal direction (direction of arrow X) respectively continue from the substrate section 31 and the respective load connection portions 33. Each of the bases 21 and 22 connects the substrate section 31 and the respective load connection portions 33. Also, the low-melting-point metal which will be described later is overlapped with the surface of the bases 21 and 22. Among the plurality of fusible portions 2A and 2B, the base 21 provided on the fusible portion 2A is formed to have a width narrower (direction of arrow X) than that of the base 22 provided on the fusible portion 2B.

The pair of crimping pieces 24 continue from both end portions of the respective bases 21, 22 and 23 (which will be described later) in a width direction (direction of arrow Y), and extend along the width direction (direction of arrow Y) of the bases 21, 22 and 23. Also, each of the crimping pieces 24 holds the low-melting-point metal, which will be described later, between the respective bases 21, 22 and 23 and the crimping piece 24 by bending the front end of the crimping piece 24, which is spaced apart from the bases 21, 22 and 23, in a direction coming close to the bases 21, 22 and 23.

When the current exceeding a predetermined current value flows in the respective bases 21, 22 and 23 which is overlapped with the low-melting-point metal, the low-melting-point metal gives rise to self-heating to cause the respective bases 21, 22 and 23 to fuse, thereby interrupting the circuit.

Each of the plurality of fusible portions 2C has a base 23 of a band plate shape, a pair of crimping pieces 24 respectively provided at a center portion of the base 23 in the longitudinal direction (direction of arrow X), and a low-melting-point metal made of a metal having a relatively low melting point, such as tin or tin alloy. Also, the plurality of fusible portions 2C are respectively provided between the substrate section 41 and a plurality of load connection portions 43, which will be described later, provided on the second busbar 4.

The base 23 is formed in the shape of band plate, and both end portions thereof in the longitudinal direction (direction of arrow X) respectively continues from the substrate section 41 and the respective load connection portions 43. The base 23 connects the substrate section 41 and the respective load connection portions 43.

Figure 2:
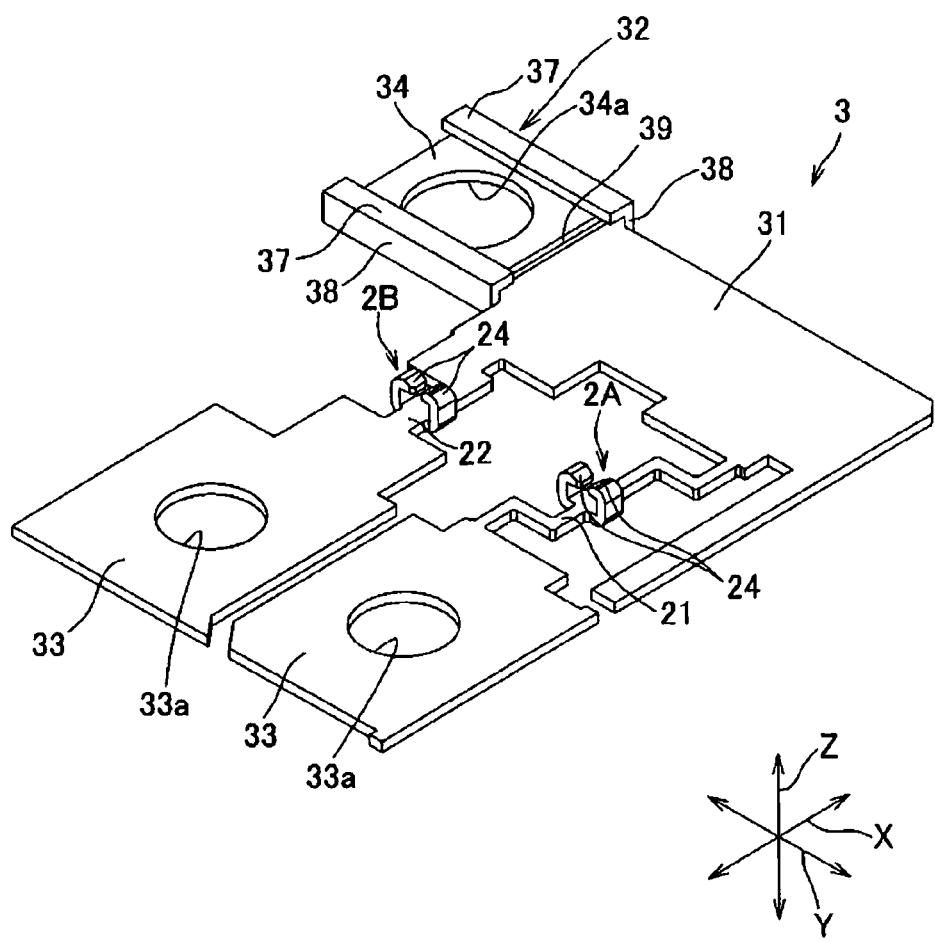
FIG. 2 is a perspective view of a first busbar of the busbar unit in FIG. 1.

The first busbar 3 integrally includes, as illustrated in FIG. 2, the substrate section 31 provided with the plurality of fusible portions 2A and 2B, the first plate section 34 that extends from the substrate section 31 in a direction (direction of arrow Y) coming close to the second busbar 4, an enclosure portion 32 provided on the first plate section 34 and serving as a retainer, a first rib 39, and the plurality of load connection portions 33 continuing from the substrate section 31 via the respective fusible portions 2A and 2B. Also, the first busbar 3 is integrally provided with the plurality of bases 21 and 22 provided on the plurality of fusible portions 2A and 2B, and one pair of crimping pieces 24 respectively provided on the respective bases 21 and 22. The direction of arrow Y in the drawing indicates a direction in which the first busbar 3 and the second busbar 4 come close to each other, and a longitudinal direction of the busbar unit 1. A direction of arrow X indicates an overlapped direction between the first busbar 3 and the second busbar 4, and a thickness (plate thickness) direction of the first busbar 3 and the second busbar 4. The arrow X is a perpendicular direction perpendicular to both the direction of arrow Y and the direction of arrow Z, and indicates the width direction of the busbar unit 1.

Figure 4:
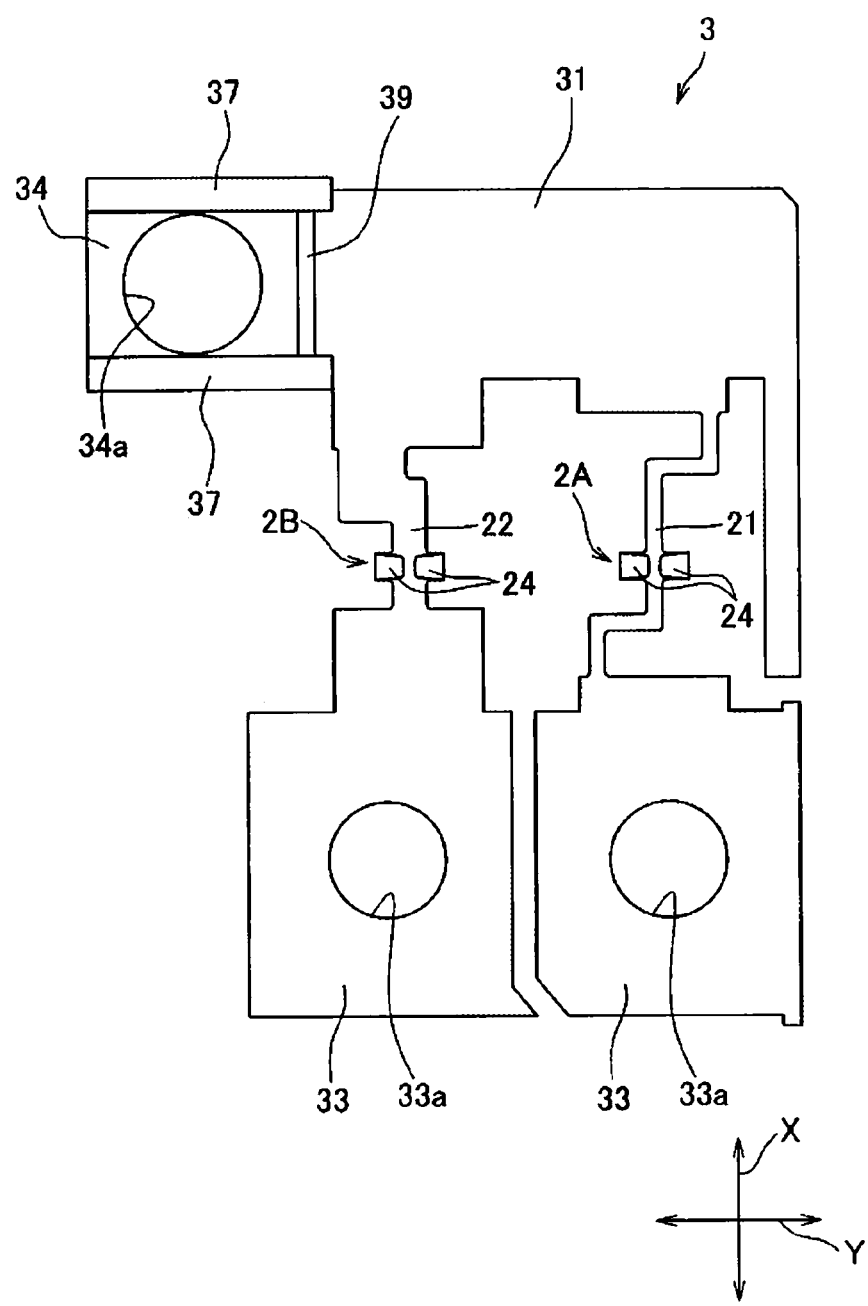
FIG. 4 is a plan view of the first busbar in FIG. 2.

The first plate section 34 is provided with a hole 34a penetrating the first busbar 3, as illustrated in FIG. 4. The hole 34a is provided at a position which communicates with a hole 44a, which will be described later, in the second plate section 44 when the first plate section 34 is overlapped with the second plate section 44 of the second busbar 4.

Figure 5:
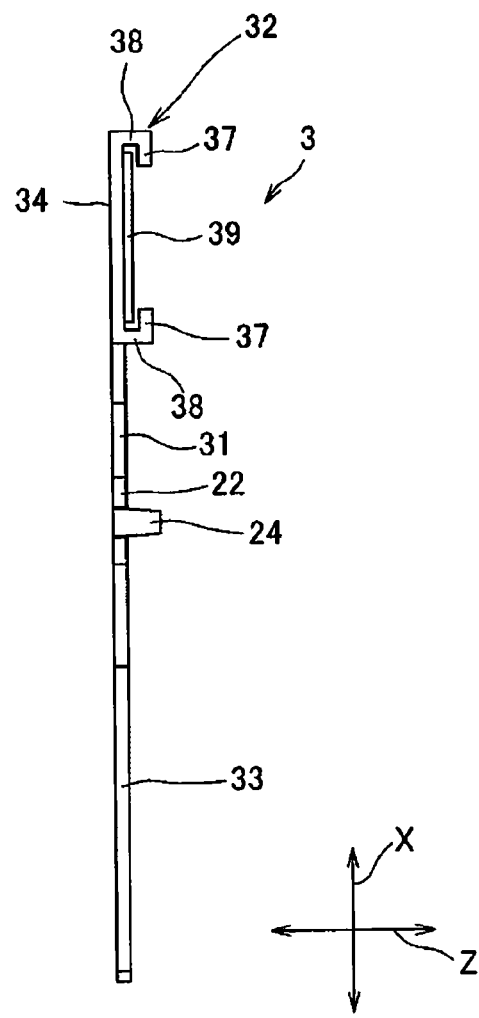
FIG. 5 is a side view of the first busbar in FIG. 2.

The enclosure portion 32 is provided with, as illustrated in FIG. 5, a pair of standing portions 38 vertically arranged from both end portions of the first plate section 34 in a direction (direction of arrow X) perpendicular to an extending direction, and a pair of overlapped plates 37 which continue from an end portion of each standing portion 38 spaced apart from the first plate section 34, and are overlapped with a surface of the second plate section 44 spaced apart from the first plate section 34. The enclosure portion 32 fixes in such a way that the first plate section 34 and the second plate section 44 are not displaced in both the direction (direction of arrow Y) in which the first plate section 34 and the second plate section 44 come close to each other, and the direction (direction of arrow Z) in which the first plate section 34 is overlapped with the second plate section 44.

The first rib 39 is formed in a convex shape from the surface of the first plate section 34, and is provided over the whole length of the first plate section 34 in the direction of arrow X. Also, the first rib 39 is provided at a position opposite to the end portion (end face) of the second plate section 44 spaced apart from the substrate section 41 when the first plate section 34 is overlapped with the second plate section 44.

The plurality of load connection portions 33 are respectively provided with a hole 33a penetrating the first busbar 3. A bolt (not illustrated) connected to the load passes through the hole 33a. A nut is fastened to the bolt passing through the hole 33a, so that the load is connected with the load connection portion 33 (first busbar 3).

Figure 6:
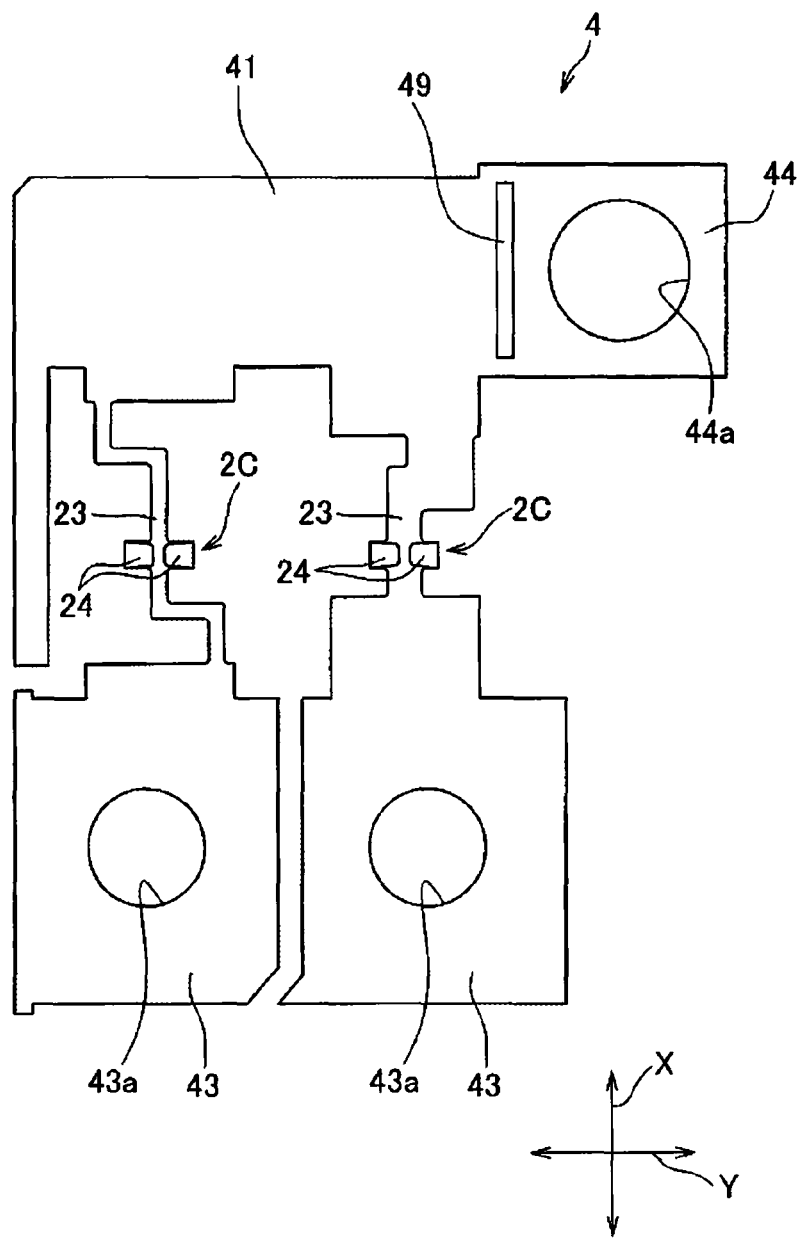
FIG. 6 is a perspective view of a second busbar of the busbar unit in FIG. 1.

The second busbar 4 integrally includes, as illustrated in FIG. 6, the substrate section 41 provided with the plurality of fusible portions 2C, the second plate section 44 that is overlapped with the first plate section 34 provided on the first busbar 3, and is provided with a hole 44a communicating with the hole 34a provided in the first plate section 34, a second rib 49, and the plurality of load connection portions 43 continuing from the substrate section 41 via the respective fusible portions 2C. Also, the second busbar 4 is integrally provided with the plurality of bases 23 provided on the plurality of fusible portions 2C, and one pair of crimping pieces 24 respectively provided on the respective bases 23.

The second rib 49 is formed in a convex shape from the surface of the second plate section 44, and extends from the second plate section 44 along the direction of arrow X. Also, the second rib 49 is provided at a position opposite to the end portion (end face) of the overlapped plate 37 spaced apart from the substrate section 31 when the first plate section 34 is overlapped with the second plate section 44.

The plurality of load connection portions 43 are respectively provided with a hole 43a penetrating the second busbar 4. A bolt (not illustrated) connected to the load passes through the hole 43a. A nut is fastened to the bolt passing through the hole 43a, so that the load is connected with the load connection portion 43 (second busbar 4).

As described above, the first busbar 3 and the second busbar 4 are made of a plurality of sheet metal having different conductivity. As the sheet metal used when the first bus bar 3 and the second bus bar 4 are formed, various kinds of alloys are used, of which the conductivity is different depending upon a kind or quantity of added elements, such as copper (Cu), or iron (Fe), tin (Su), phosphorous (P), zinc (Zn), or nickel (Ni) which contains a copper alloy as a main component.

The housing section is made of synthetic resin having relatively high heat-resistance, such as nylon resin or polypropylene resin. The housing section is embedded with the busbars 3 and 4 by the insert molding in the state in which the first plate section 34 is overlapped with the second plate section 44. As the first busbar 3 and the second busbar 4 are attached to each other, the housing section accommodates the first plate section 34 and the second plate section 44.

Next, a process of assembling the above-described busbar unit 1 will now be described. First, as the sheet metal having the conductivity is subjected to punching, the first busbar 3 integrally including the plurality of bases 21 and 22, one pair of crimping pieces 24 respectively provided on the respective bases 21 and 22, the substrate section 31, the first plate section 34, the enclosure portion 32, the first rib 39, and the plurality of load connection portions 33 is formed. The low-melting-point metal is overlapped with each of the plurality of bases 21 and 22 provided on the first busbar 3, and the front end of the crimping piece 24, which is spaced apart from the bases 21 and 22, is bent in the direction coming close to the bases 21 and 22 in the state in which low-melting-point metal is overlapped with each of the plurality of bases 21 and 22, so that the plurality of fusible portions 2A and 2B are assembled, and also are provided on the substrate section 31.

Next, as the sheet metal having the conductivity lower than that of the first busbar 3 is subjected to punching, the second busbar 4 integrally including the plurality of bases 23, one pair of crimping pieces 24 respectively provided on the respective bases 23, the substrate section 41, the second plate section 44, the second rib 49, and the plurality of load connection portions 43 is formed. The low-melting-point metal is overlapped with each of the plurality of bases 23 provided on the second busbar 4, and the front end of the crimping piece 24, which is spaced apart from the bases 23, is bent in the direction coming close to the bases 23 in the state in which low-melting-point metal is overlapped with each of the plurality of bases 23, so that the plurality of fusible portions 2C are assembled, and also are provided on the substrate section 41.

Figure 7:
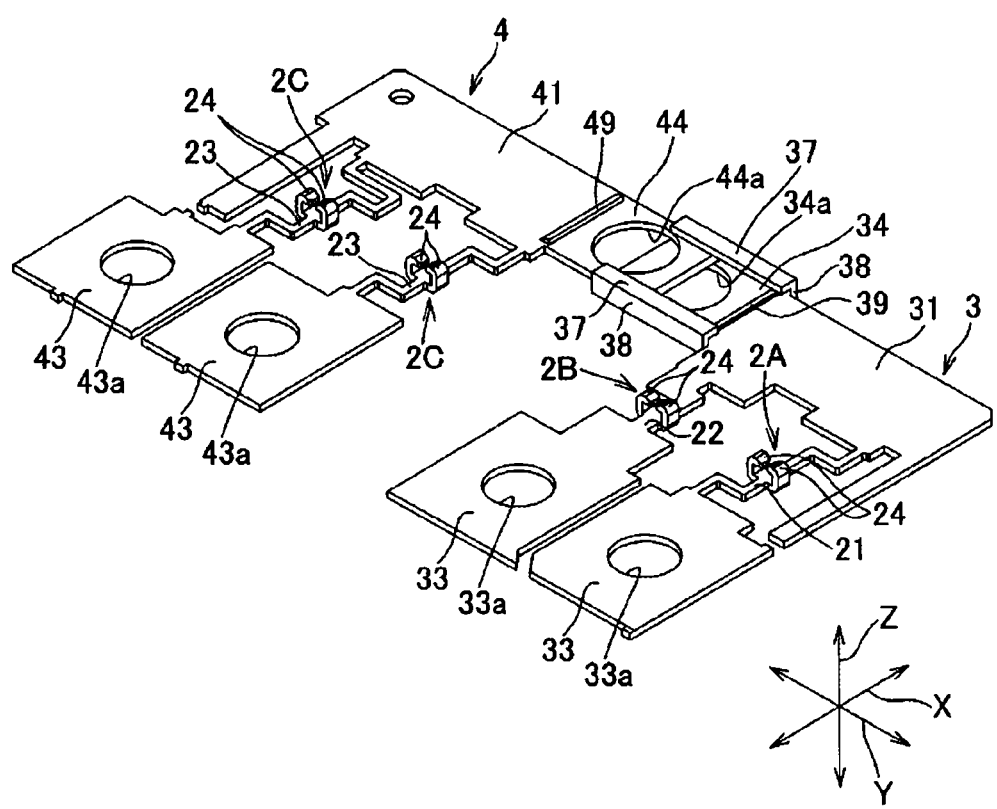
FIG. 7 is an explanation view explaining an assembling work of the busbar unit in FIG. 1 and illustrating a state in which the first and second busbars of the busbar unit come close to each other.
Figure 8:
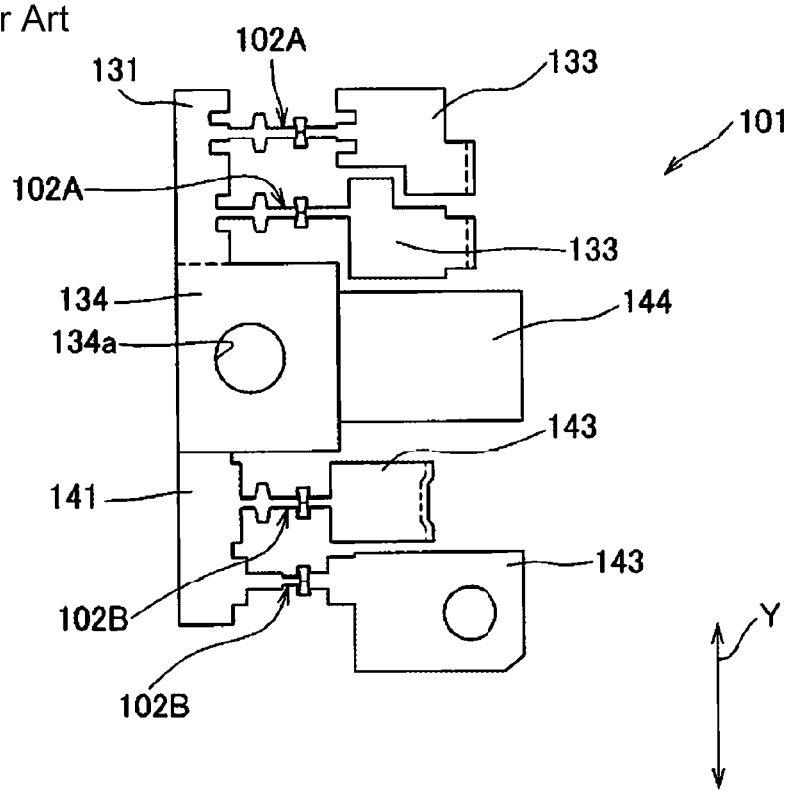
FIG. 8 is a plan view illustrating a busbar unit according to the related art.
Figure 9:
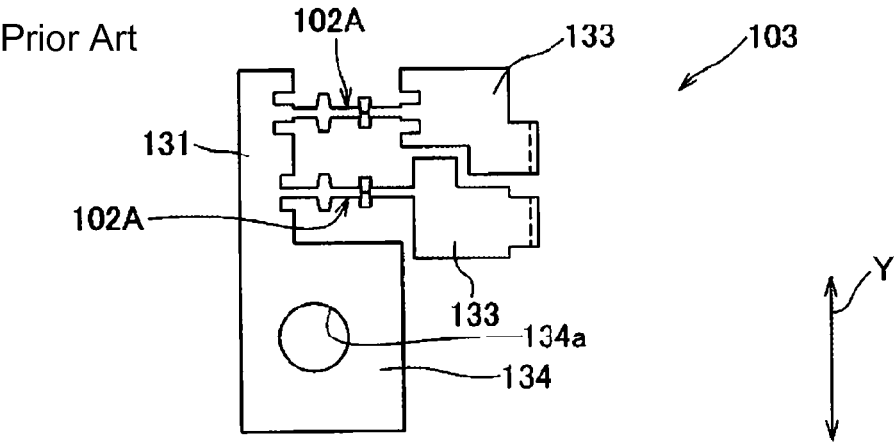
FIG. 9 is a plan view illustrating a first busbar configuring the busbar unit in FIG. 8.
Figure 10:
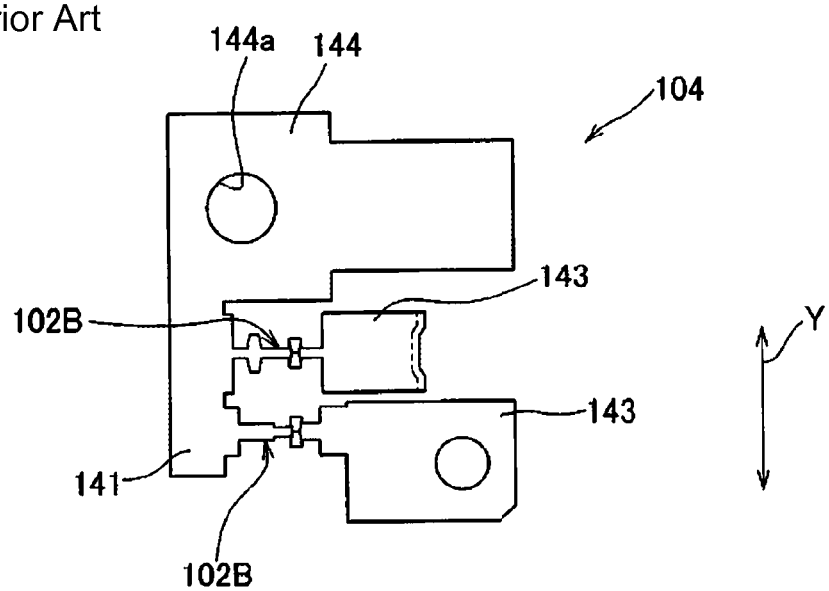
FIG. 10 is a plan view illustrating a second busbar configuring the busbar unit in FIG. 8.

As illustrated in FIG. 7, the first busbar 3 and the second busbar 4 come close to each other along the direction (arrow Y) in which they come close to each other, and then the second plate section 44 is slid the inside of the enclosure portion 32 so that the second plate section 44 is overlapped with the first plate section 34. Thus, the first plate section 34 and the second plate section 44 are overlapped with each other, and the hole 34a formed in the first plate section 34 communicates with the hole 44a formed in the second plate section 44. The end face of the end portion of the second plate section 44 spaced apart from the substrate section 41 is positioned at the position opposite to the first rib 39. Also, the first busbar 3 and the second busbar 4 are integrally attached to each other by the insert molding in the state in which the first and second plate sections 34 and 44 are overlapped. In this way, the busbar unit 1 including the plurality of busbars 3 and 4 which are provided with the plurality of fusible portions 2A, 2B and 2C is assembled. The holes 34a and 44a of the busbar unit 1 assembled by the above manner are connected to a battery post provided on a battery, and the plurality of load connection portions 33 and 43 provided on the respective busbars 3 and 4 are respectively connected to the plurality of loads. In this way, the busbar unit 1 supplies electricity from the battery to each of the plurality of loads, which are driven by a different driving current, via the plurality of fusible portions 2A, 2B and 2C.

According to the above-described embodiment, in the busbar unit 1 including the first busbar 3 having the substrate section 31 provided with the first fusible portions 2A and 2B, and the first plate section 34 that extends from the substrate section 31; the second busbar 4 having the substrate section 41 provided with the second fusible portion 2C, and the second plate section 44 overlapped with the first plate section 34; and the insulating housing section that accommodates the first and second plate sections 34 and 44 in the state in which the first and second plate sections 34 and 44 are overlapped with each other, the first plate section 34, which is any one of the first and second plate sections 34 and 44, is provided with the enclosure portion 32 as a retainer for fixing the first and second plate sections 34 and 44 so that the first and second plate sections 34 and 44 are not displaced in both the direction (direction of arrow Y) in which the first plate section 34 and the second plate section 44 come close to each other, or the direction (direction of arrow Z) in which the first plate section 34 is overlapped with the second plate section 44. As a result, the first and second plate sections 34 and 44 are insert-molded, without being displaced in both the overlapped direction (direction of arrow Z) and the perpendicular direction (direction of arrow Z). Therefore, the busbar unit 1 capable of improving the productivity can be provided.

As the retainer, the enclosure portion 32 is provided with, as illustrated in FIG. 5, the standing portions 38 vertically arranged from both end portions of the first plate section 34 in the direction (direction of arrow X) perpendicular to both the direction (direction of arrow Y) in which the first plate section 34 and the second plate section 44 come close to each other and the direction (direction of arrow Z) in which the first plate section 34 is overlapped with the second plate section 44, and the overlapped plates 37 which continue from the standing portions 38, and are overlapped with the second plate section 44 which is the other plate section. Therefore, while the first plate section 34 (first busbar 3) and the second plate section 44 (second busbar 4) are not displaced in both the overlapped direction (direction of arrow Z) and the perpendicular direction (direction of arrow Y) of the first plate section 34 and the second plate section 44, the first plate section 34 which is the one plate section is slid along the direction coming close to the other, and thus the workability to overlap the busbars 3 and 4 can be improved.

Also, when the first busbar 3 and the second busbar 4 are subjected to the insert forming, the resin is prevented from flowing between the first and second plate sections 34 and 44 (busbars 3 and 4) by the standing portion 38 and the overlapped plates 37. Accordingly, since the resin does not flow between the first and second plate sections 34 and 44 (busbars 3 and 4), the first and second plate sections 34 and 44 (busbars 3 and 4) can be closely overlapped with each other. As a result, it is possible to improve the reliability in the electrical connection between the first and second plate sections 34 and 44 (busbars 3 and 4).

As the rib, the first rib 39 is formed in the convex shape from the surface of the first plate section 34 which is the one plate section, and is provided at the position opposite to the end of the second plate section 44, which is the other plate section, spaced apart from the substrate section 41 when the first plate section 34 is overlapped with the second plate section 44. As a result, the first rib covers the gap between the first and second plate sections 34 and 44, and thus, at the time of insert molding, it is possible to prevent the resin from flowing between the first and second plate sections 34 and 44 which are overlapped with each other in the approaching direction (direction of arrow Y). Therefore, since the resin does not flow between the first and second plate sections 34 and 44 (busbars 3 and 4), the first and second plate sections 34 and 44 (busbars 3 and 4) can be closely overlapped with each other. Thus, it is possible to further improve the reliability in the electrical connection between the first and second plate sections 34 and 44 (busbars 3 and 4).

Meanwhile, the first busbar 3 and the second busbar 4 configuring the above-described busbar unit 1 are made of the sheet metal having different conductivity, but the present invention is not limited thereto. The first busbar 3 may be formed to have a first thickness, and the second busbar 4 may be formed to have a second thickness thinner than the first thickness, in which the first busbar 3 and the second busbar 4 may be made of a sheet metal having the same conductivity. Also, the first busbar 3 may be formed to have a first thickness, and the second busbar 4 may be formed to have a second thickness thinner than the first thickness, in which the first busbar 3 and the second busbar 4 may be made of a sheet metal having the different conductivity. As described above, since the first busbar 3 is formed to have the first thickness, and the second busbar 4 is formed to have the second thickness thinner than the first thickness, for example, the first busbar 3 having the substrate section 31 provided with the first fusible portions 2A and 2B which interrupt the power supply if a current exceeding a first rated current flows is obtained by punching the sheet metal which is formed to have the first thickness. Also, the second busbar 4 having the substrate section 41 provided with the second fusible portions 2C which interrupt the power supply if a current exceeding a second rated current flows is obtained by punching the sheet metal which is formed to have the second thickness thinner than the first thickness. Accordingly, if the plate thickness of the sheet metal is changed, it is possible to easily form the busbars 3 and 4 provided with the fusible portions 2A, 2B and 2C corresponding to the load which is operated by different driving current, without manufacturing a mould for punching. In addition, if the plurality of busbars 3 and 4 are combined, it is possible to easily extensively cope with the load which is operated by the different driving current.

Although the busbar unit of the present invention has been described in detail with reference to specific embodiments, but the above-described embodiment is merely the best mode of the present invention. The present invention is not limited to the embodiment. That is, the present invention can be properly modified or revised, without deviating from the scope of the invention.

This application claims priority to Japanese Patent Application No. 2010-171821 filed on Jul. 30, 2010, and the entire disclosure thereof is hereby incorporated herein by way of reference.

INDUSTRIAL APPLICATION

According to the busbar unit according to the present invention, the first plate section and the second plate section are subjected to the insert molding, without being displaced in both the overlapped direction and the perpendicular direction, and thus the busbar unit with the improved productivity can be provided.

REFERENCE NUMERALS LIST 1 busbar unit
2A and 2B fusible portion (first fusible portion)
2C fusible portion (second fusible portion)
3 first busbar
31 substrate section
32 enclosure portion (retainer)
34 first plate section (one plate section)
34a hole
37 overlapped plate
38 standing portion
39 first rib (rib)
4 second busbar
41 substrate section
44 second plate section (the other plate section)
44a hole
Direction of arrow Y approaching direction
Direction of arrow Z overlapped direction
Direction of arrow X perpendicular direction

The invention claimed is:
1. A busbar unit comprising:
a first busbar comprising:
a substrate section provided with a first fusible portion; and
a first plate section extending from the substrate section;
a second busbar comprising:
a substrate section provided with a second fusible portion; and
a second plate section overlapped with the first plate section; and
an insulating housing section configured to accommodate the first plate section and second plate section in a state in which the first plate section and second plate section are overlapped with each other,
wherein one of the first plate section and second plate section is integrally formed with a retainer configured to fix the first plate section and second plate section and configured to prevent the first plate section and second plate section from being displaced in a first direction in which the first plate section and second plate section are displaced close to each other and in a second direction corresponding to a thickness direction of the busbar unit,
wherein the retainer is coplanar with the first and the second busbars, and
wherein only the first and the second plate sections accommodated in the retainer are portions of the first and the second busbars being overlapped with each other.

2. The busbar unit according to claim 1, wherein
the retainer is provided with a standing portion vertically arranged from an end portion of the one of first plate section and the second plate section in a perpendicular direction which is perpendicular to both the direction in which the first plate section and the second plate section come close to each other and the direction in which the first plate section is overlapped with the second plate section, and an overlapped plate which extended from the standing portion and is overlapped with the other of the first plate section and the second plate section.

3. The busbar unit according to claim 1, wherein
a rib having a convex shape protrudes from a surface of the one of the first plate section and the second plate section, and the rib is provided at a position opposite to an end portion of the other of the first plate section and the second plate section in a state where the first plate section is overlapped with the second plate section, and
the end portion of the other of the first plate section and the second plate section is spaced apart from the substrate section of the other of the first plate section and the second plate section.

4. The busbar unit according to claim 3, wherein the rib covers a gap between the first plate section and the second plate section.

5. The busbar unit according to claim 1, wherein
the first busbar has a first thickness, and
the second busbar has a second thickness thinner than the first thickness.

6. The busbar unit according to claim 1, wherein the retainer and the rib are configured to overlap each other.

7. The busbar unit according to claim 1, wherein the other one of the first plate section and second plate section comprises a first end in the first direction attached to a corresponding substrate section and a second end opposite from the first end, and
wherein the second end of the other one of the first plate section and second plate section is configured to contact a rib in response to the first plate section and second plate section being overlapped.

8. The busbar unit according to claim 1, wherein the first busbar is made of a material having conductivity higher than conductivity of the second bus bar.

9. The busbar unit according to claim 1, wherein
at least one of the first plate section and the second plate section includes a rib having a convex shape and protruding from a surface of the one of the first plate section and the second plate section, and the retainer and the rib are configured to overlap each other.

* * * * *